(12) United States Patent
Soma et al.

(10) Patent No.: US 11,646,615 B2
(45) Date of Patent: May 9, 2023

(54) ROTOR OF ROTATING ELECTRICAL MACHINE AND ARC MAGNET MANUFACTURING METHOD

(71) Applicant: HONDA MOTOR CO., LTD., Tokyo (JP)

(72) Inventors: Shingo Soma, Saitama (JP); Yoshihisa Kubota, Saitama (JP); Tatsuya Ohzu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 17/167,569

(22) Filed: Feb. 4, 2021

(65) Prior Publication Data
US 2021/0242732 A1    Aug. 5, 2021

(30) Foreign Application Priority Data

Feb. 5, 2020    (JP) .............................. JP2020-018176

(51) Int. Cl.
| H02K 1/27 | (2022.01) |
| H02K 15/03 | (2006.01) |
| H02K 1/276 | (2022.01) |

(52) U.S. Cl.
CPC ............. *H02K 1/276* (2013.01); *H02K 15/03* (2013.01); *H02K 2213/03* (2013.01)

(58) Field of Classification Search
CPC ..... H02K 15/03; H02K 1/276; H02K 2213/03
USPC ..................................................... 310/156.56
See application file for complete search history.

(56) References Cited

U.S. PATENT DOCUMENTS

| 8,803,394 | B2* | 8/2014 | Sano ..................... H02K 1/2766 310/216.106 |
| 9,231,445 | B2* | 1/2016 | Sano ..................... H02K 1/2766 |
| 10,404,115 | B2* | 9/2019 | Kawasaki ............. H02K 1/146 |
| 10,411,534 | B2* | 9/2019 | Nakano ................ H02K 1/2766 |
| 2013/0307363 | A1* | 11/2013 | Sano ......................... H02K 1/27 310/156.01 |
| 2016/0380492 | A1* | 12/2016 | Kawasaki ............. H02K 21/16 310/156.11 |
| 2018/0145552 | A1* | 5/2018 | Hattori ................. H02K 1/2766 |
| 2018/0183286 | A1* | 6/2018 | Nakano ................. H02K 1/274 |
| 2018/0254676 | A1* | 9/2018 | Nigo ..................... H02K 21/16 |
| 2018/0269734 | A1* | 9/2018 | Soma .................... H02K 21/14 |

FOREIGN PATENT DOCUMENTS

| EP | 3337014 A2 | 6/2018 |
| JP | 2018-102039 A | 6/2018 |

\* cited by examiner

*Primary Examiner* — Alex W Mok
(74) *Attorney, Agent, or Firm* — Paratus Law Group, PLLC

(57) ABSTRACT

A rotor of a rotating electrical machine includes a substantially annular rotor core and a plurality of magnetic pole portions formed at predetermined intervals in a circumferential direction of the rotor core. Each magnetic pole portion includes an outer diameter side magnet portion configured by an outer diameter side circular arc magnet arranged so as to protrude radially inward and an inner diameter side magnet portion located radially inward of the outer diameter side magnet portion and configured by a pair of inner diameter side arc magnets arranged so as to radially inward of the radially outer magnet portion. Each arc magnet is an arc magnet in which an inner peripheral surface and an outer peripheral surface have the same arc center.

6 Claims, 4 Drawing Sheets

ROTOR OF ROTATING ELECTRICAL MACHINE AND ARC MAGNET MANUFACTURING METHOD

CROSS-REFERENCE TO RELATED APPLICATIONS

The present application claims priority from Japanese Patent Application No. 2020-018176 filed on Feb. 5, 2020, the entire content of which is incorporated herein by reference.

TECHNICAL FIELD

The present invention relates to a rotor of a rotating electrical machine to be mounted on an electric vehicle or the like, and an arc magnet manufacturing method for manufacturing arc magnets of a rotor of a rotating electrical machine.

BACKGROUND ART

In the related art, a rotating electrical machine such as an electric motor and a generator is mounted on an electric vehicle such as a hybrid vehicle, a battery drive vehicle, a fuel cell vehicle, or the like. With the spread of these electric vehicles, the rotating electrical machine mounted on an electric vehicle is further required to reduce the manufacturing cost. Further, the rotating electrical machine mounted on an electric vehicle is required to be further reduced in size in order to increase the vehicle interior space.

For example, Patent Literature 1 discloses a rotor of a rotating electrical machine in which a plurality of permanent magnets are arranged in a radial direction. Each permanent magnet arranged in the rotor of Patent Literature 1 has substantially the same shape as viewed in the axial direction. Therefore, since the same arc magnet can be used for each permanent magnet arranged in the rotor, the manufacturing cost of the arc magnet can be reduced, and thus the manufacturing cost of the rotor can be reduced.

CITATION LIST

Patent Literature

Patent Literature 1: JP-A-2018-102039

SUMMARY OF INVENTION

Technical Problem

However, in the rotor of Patent Literature 1, since the arc center of each arc magnet arranged in the plurality of layers is located on the d-axis, when a plurality of arc magnets are arranged on the same layer, there is a problem that the circumferential length of the magnetic pole portion is increased, and the size of the rotor is increased.

The present invention provides a rotor of a rotating electrical machine capable of suppressing an increase in size while reducing the manufacturing cost, and an arc magnet manufacturing method for manufacturing an arc magnet of a rotor of a rotating electrical machine.

Solution to Problem

The present invention relates to a rotor, including:
a substantially annular rotor core, and
a plurality of magnetic pole portions formed at predetermined intervals in a circumferential direction of the rotor core, in which
each magnetic pole portion including:
an outer diameter side magnet portion including an outer diameter side arc magnet arranged to protrude radially inward, and
an inner diameter side magnet portion located inward of the outer diameter side magnet portion in the radial direction and including a pair of inner diameter side arc magnets arranged so as to protrude radially inward,
each arc magnet is an arc magnet in which an inner peripheral surface and an outer peripheral surface have the same arc center,
in a case where a center axis of each magnetic pole portion is set as a d-axis, and an axis separated from the d-axis by 90 electrical degrees is set as a q-axis,
the outer diameter side magnet portion and the inner diameter side magnet portion are formed symmetrically with respect to the d-axis,
the outer diameter side arc magnet is disposed so as to be symmetrical with respect to the d-axis in the circumferential direction,
the pair of inner diameter side arc magnets including:
a first inner diameter side arc magnet located on one side with respect to the d-axis in the circumferential direction, and
a second inner diameter side arc magnet located on the other side with respect to the d-axis in the circumferential direction,
the first inner diameter side arc magnet and the second inner diameter side arc magnet are arranged so as to be symmetrical with respect to the d-axis,
the outer diameter side arc magnet, the first inner diameter side arc magnet, and the second inner diameter side arc magnet have substantially the same shape as viewed in the axial direction,
an arc center of the outer diameter side arc magnet is located on the d-axis,
an arc center of the first inner diameter side arc magnet is located on the other side with respect to the d-axis in the circumferential direction, and
an arc center of the second inner diameter side arc magnet is located on the one side with respect to the d-axis in the circumferential direction.

Advantageous Effects of Invention

According to the present invention, since the outer diameter side arc magnet, the first inner diameter side arc magnet, and the second inner diameter side arc magnet have substantially the same shape, the same arc magnet can be used for the outer diameter side arc magnet, the first inner diameter side arc magnet, and the second inner diameter side arc magnet, and the manufacturing cost of the outer diameter side arc magnet, the first inner diameter side arc magnet, and the second inner diameter side arc magnet can be reduced. Thus, the manufacturing cost of the rotor of the rotating electrical machine can be reduced. Further, since the arc center of the outer diameter side arc magnet is located on the d-axis, the arc center of the first inner diameter side arc magnet is located on the other side with respect to the d-axis in the circumferential direction, and the arc center of the second inner diameter side arc magnet is located on one side with respect to the d-axis in the circumferential direction, the increase in the circumferential length of the magnetic pole portion can be suppressed, and the increase in the size of the rotor can be suppressed.

DESCRIPTION OF EMBODIMENTS

An embodiment of a rotor of a rotating electrical machine of the present invention will be described below with reference to the accompanying drawings.

(Rotor)

Figure 1:
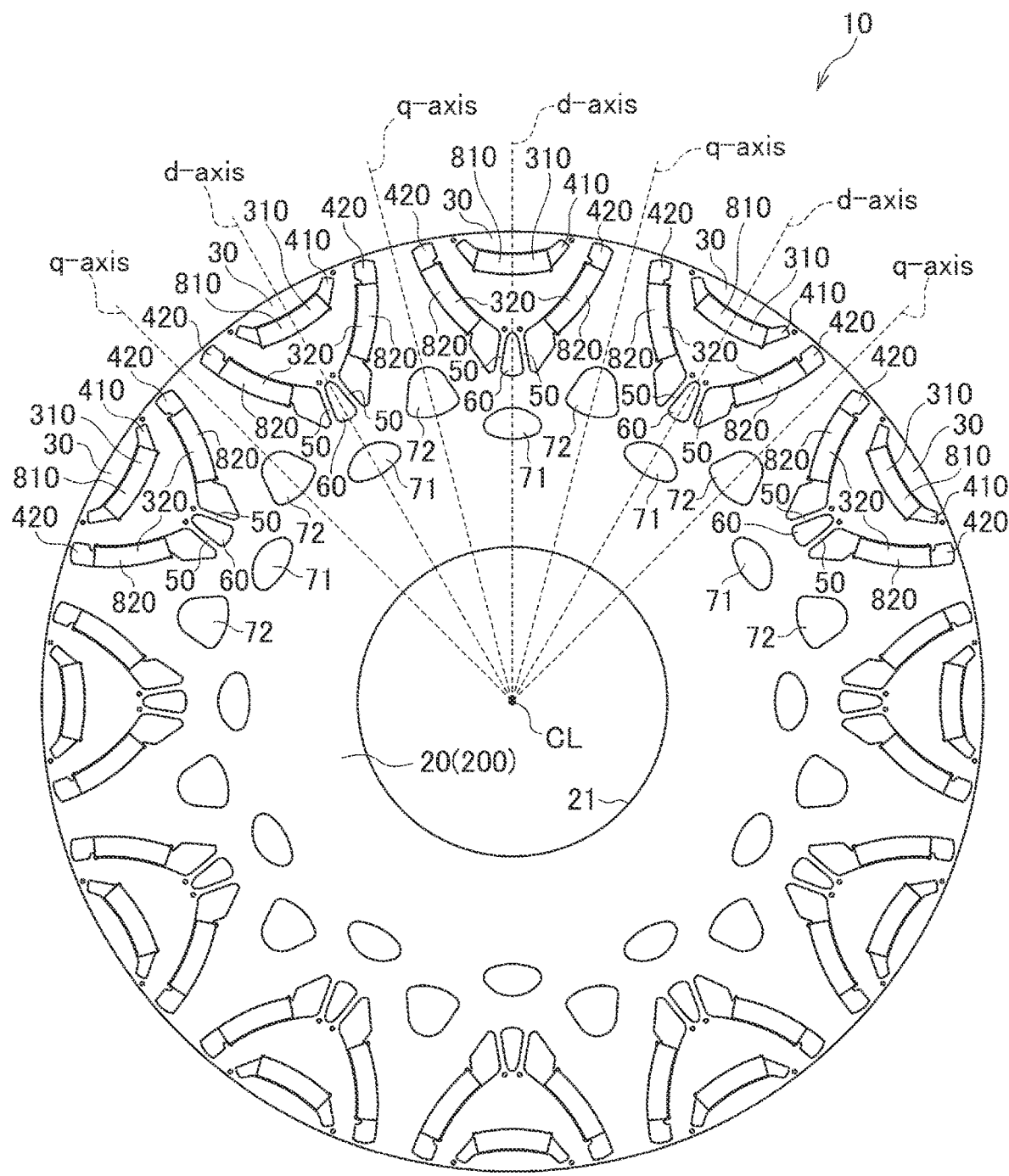
FIG. 1 is a front view of a rotor of a rotating electrical machine according to a first embodiment of the present invention as viewed from an axial direction.

As shown in FIG. 1, a rotor 10 of a rotating electrical machine according to the embodiment of the present invention includes a rotor core 20 which is attached to an outer peripheral portion of a rotor shaft (not shown), and has a substantially annular shape centered on an annular center CL, and a plurality of magnetic pole portions 30 (twelve in the present embodiment) which are formed at predetermined intervals in the circumferential direction of the rotor core 20. The rotor 10 is disposed on an inner circumferential side of a stator (not shown).

In the present specification and the like, an axial direction, a radial direction, and a circumferential direction are directions based on the annular center CL of the rotor 10.

The rotor core 20 is formed by laminating a plurality of substantially annular electromagnetic steel plates 200 having the same shape in the axial direction. The rotor core 20 has a rotor shaft hole 21 concentric with the annular center CL. Further, when the center axis of each magnetic pole portion 30 connecting the annular center CL and the center of each magnetic pole portion 30 is set as a d-axis (d-axis in the drawing), and an axis separated from the d-axis by 90 electrical degrees is set as a q-axis (q-axis in the drawing), each magnetic pole portion 30 of the rotor core 20 includes an outer diameter side magnet insertion hole 410 which is formed so as to cross the d-axis and has a symmetrical shape with respect to the d-axis. Each magnetic pole portion 30 of the rotor core 20 includes a pair of inner diameter side magnet insertion holes 420 which are located radially inward of the outer diameter side magnet insertion hole 410 and are formed symmetrically with respect to the d-axis. Each of the outer diameter side magnet insertion hole 410 and the pair of inner diameter side magnet insertion holes 420 has an arc shape protruding radially inward.

Each magnetic pole portion 30 of the rotor core 20 is provided with a gap portion 60 formed so as to cross the d-axis between the pair of inner diameter side magnet insertion holes 420 in the circumferential direction. The rotor core 20 is provided with a pair of ribs 50 extending in the radial direction between the pair of inner diameter side magnet insertion holes 420 and the gap portion 60.

The rotor core 20 includes a first lightening hole 71 formed at a position crossing the d-axis inside the gap portion 60 of each magnetic pole portion 30 in the radial direction and a second lightening hole 72 formed at a position crossing the q-axis between the adjacent magnetic pole portions 30. The first lightening hole 71 has a shape symmetrical with respect to the d-axis. The second lightening hole 72 is symmetrical with respect to the q-axis.

Each magnetic pole portion 30 includes an outer diameter side magnet portion 310 and an inner diameter side magnet portion 320 located radially inward of the outer diameter side magnet portion 310. The outer diameter side magnet portion 310 is configured by an outer diameter side arc magnet 810 arranged so as to protrude radially inward. The inner diameter side magnet portion 320 is configured by at least a pair of inner diameter side arc magnets 820 arranged so as to protrude radially inward. The outer diameter side magnet portion 310 and the inner diameter side magnet portion 320 are formed symmetrically with respect to the d-axis.

The outer diameter side magnet 810 constituting the outer diameter side magnet portion 310 is inserted into the outer diameter side magnet insertion hole 410 of the rotor core 20. The pair of inner diameter side arc magnets 820 constituting the inner diameter side magnet portion 320 are inserted into the pair of inner diameter side magnet insertion holes 420 of the rotor core 20.

The outer diameter side arc magnet 810 and the pair of inner diameter side arc magnets 820 are magnetized in the radial direction. The outer diameter side arc magnet 810 and the pair of inner diameter side arc magnets 820 are arranged such that the magnetization directions thereof are different from that of the adjacent magnetic pole portion 30, and the magnetization directions of the magnetic pole portions 30 are alternately different in the circumferential direction.

(Magnetic Pole Portion)

Figure 2:
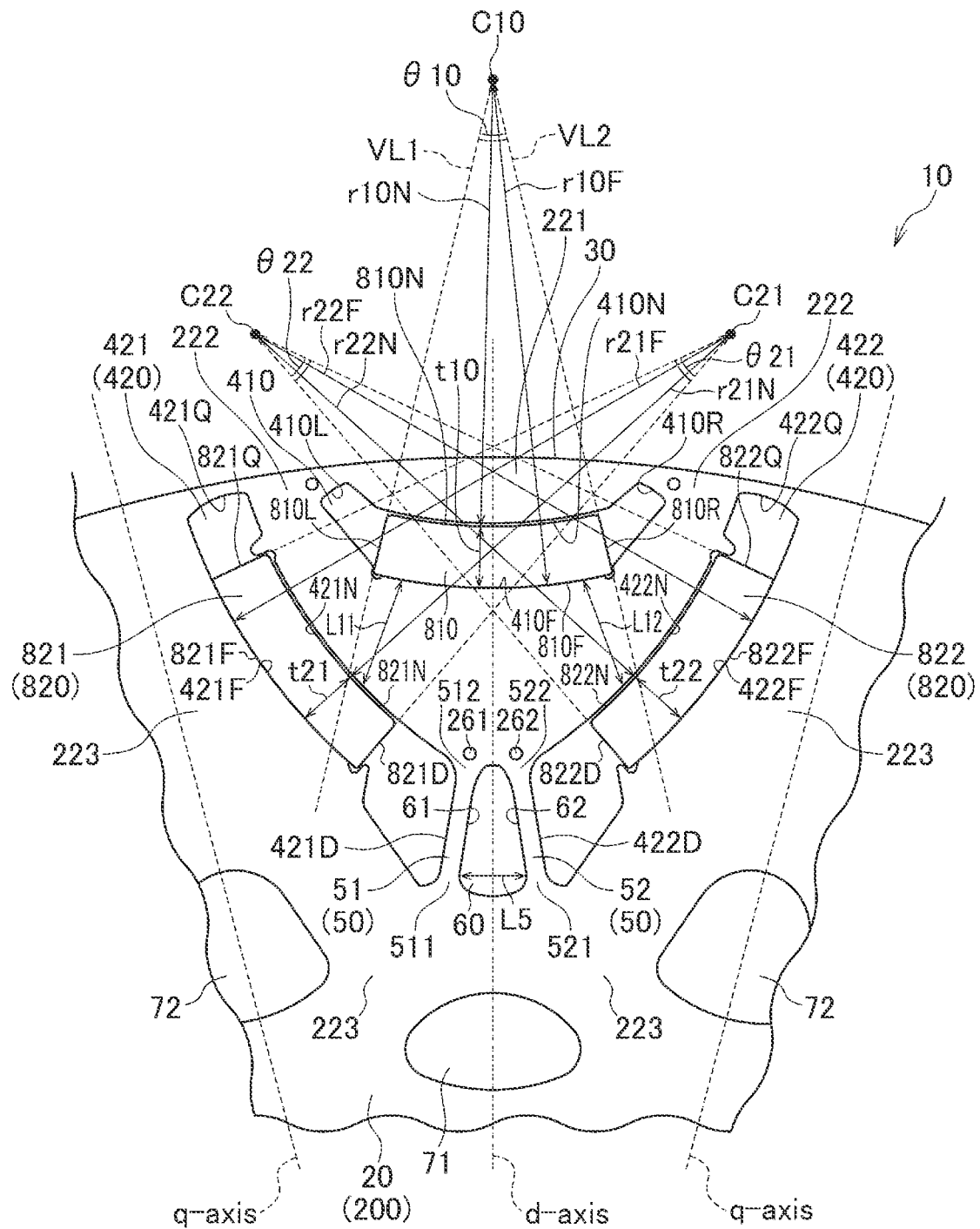
FIG. 2 is an enlarged view around a magnetic pole portion of the rotor of the rotating electrical machine of FIG. 1.

As shown in FIG. 2, the pair of inner diameter side magnet insertion holes 420 includes a first inner diameter side magnet insertion hole 421 formed on one side (left side in FIG. 2) in the circumferential direction with respect to the d-axis and a second inner diameter side magnet insertion hole 422 formed on the other side (right side in FIG. 2) with respect to the d-axis.

The first inner diameter side magnet insertion hole 421 and the second inner diameter side magnet insertion hole 422 are provided in a substantially V-shape extending outward in the radial direction so as to increase the circumferential distance therebetween.

The pair of inner diameter side arc magnets 820 includes a first inner diameter side arc magnet 821 which is inserted into the first inner diameter side magnet insertion hole 421 and located on one side (left side in FIG. 2) in the circumferential direction with respect to the d-axis, and a second inner diameter side arc magnet 822 which is inserted into the second inner diameter side magnet insertion hole 422 and located on the other side (right side in FIG. 2) in the circumferential direction with respect to the d-axis.

Each magnetic pole portion 30 of the rotor core 20 includes: a first rotor yoke portion 221 which is formed radially outward of the outer diameter side magnet insertion hole 410 and extends in the circumferential direction; a second rotor yoke portion 222 which is formed between the outer diameter side magnet insertion hole 410, the first inner diameter side magnet insertion hole 421 and the second inner diameter side magnet insertion hole 422, and is curved so as to protrude radially inward and extends in the circumferential direction; and a third rotor yoke portion 223 which is formed radially inward of the first inner diameter side magnet insertion hole 421 and the second inner diameter side magnet insertion hole 422, and is curved so as to protrude radially inward and extends in the circumferential direction.

Hereinafter, in order to simplify and clarify the description and the like, when the rotor 10 is viewed from the axial direction, the annulus center CL is set to be a lower side, and d-axis direction outer diameter side is set to be an upper side, one side in the circumferential direction (left side in FIG. 2) is defined as a left side, and the other side in the circumferential direction (right side in FIG. 2) is defined as a right side. In the present specification and the like, the inner side in the circumferential direction refers to the center side in the circumferential direction of each magnetic pole portion 30, that is, the d-axis side, and the outer side in the circumferential direction refers to both end sides in the circumferential direction of each magnetic pole portion 30, that is, the q-axis side.

The outer diameter side arc magnet 810 includes an inner peripheral surface 810N and an outer peripheral surface 810F having the same arc center C10, a left end portion 810L located on one side in the circumferential direction, and a right end portion 810R located on the other side in the circumferential direction. The arc center C10 of the outer diameter side arc magnet 810 is located on the d-axis. The inner peripheral surface 810N of the outer diameter side arc magnet 810 has a substantially arc shape with an inner peripheral radius r10N centered on the arc center C10. The outer peripheral surface 810F of the outer diameter side arc magnet 810 has a substantially arc shape with an outer peripheral radius r10F centered on the arc center C10. The thickness t10 of the outer diameter side arc magnet 810 is substantially the same as the value of (outer peripheral radius r10F)−(inner peripheral radius r10N).

The first inner diameter side arc magnet 821 includes an inner peripheral surface 821N and an outer peripheral surface 821F having the same arc center C21, a q-axis side end portion 821Q, and ad-axis side end portion 821D. The arc center C21 of the first inner diameter side arc magnet 821 is located on the right side opposite to the first inner diameter side arc magnet 821 with respect to the d-axis. The inner peripheral surface 821N of the first inner diameter side arc magnet 821 has a substantially arc shape with an inner peripheral radius r21N centered on the arc center C21. The outer peripheral surface 821F of the first inner diameter side arc magnet 821 has a substantially arc shape with an outer peripheral radius r21F centered on the arc center C21. The thickness t21 of the first inner diameter side arc magnet 821 is substantially the same as the value of (outer peripheral radius r21F)−(inner peripheral radius r21N).

The second inner diameter side arc magnet 822 includes an inner peripheral surface 822N and an outer peripheral surface 822F having the same arc center C22, a q-axis side end portion 822Q, and a d-axis side end portion 822D. The arc center C22 of the second inner diameter side arc magnet 822 is located on the left side opposite to the second inner diameter side arc magnet 822 with respect to the d-axis. The inner peripheral surface 822N of the second inner diameter side arc magnet 822 has a substantially arc shape with an inner peripheral radius r22N centered on the arc center C22. The outer peripheral surface 822F of the second inner diameter side arc magnet 822 has a substantially arc shape with an outer peripheral radius r22F centered on the arc center C22. The thickness t22 of the second inner diameter side arc magnet 822 is substantially the same as the value of (outer peripheral radius r22F)−(inner peripheral radius r22N).

Since the arc center C21 of the first inner diameter side arc magnet 821 is located on the right side opposite to the first inner diameter side arc magnet 821 with respect to the d-axis, and the arc center C22 of the second inner diameter side arc magnet 822 is located on the left side opposite to the second inner diameter side arc magnet 822 with respect to the d-axis, both a distance L11 between the first inner diameter side arc magnet 821 and the outer diameter side arc magnet 810 and a distance L12 between the second inner diameter side arc magnet 822 and the outer diameter side arc magnet 810 increase as closer from the q-axis to the d-axis.

Thus, the increase in the circumferential length of the magnetic pole portion 30 can be suppressed, and the increase in the size of the rotor 10 can be suppressed. In addition, a magnetic path along the q-axis in the rotor 10 (hereinafter, also referred to as a q-axis magnetic path) can be widened, and the reluctance torque of the rotating electrical machine can be increased, the output performance of the rotating electrical machine can be improved. Further, the magnetic flux due to the first inner diameter side arc magnet 821 and the second inner diameter side arc magnet 822 and the outer diameter side arc magnet 810 is easily concentrated on the d-axis, and the magnet torque of the rotating electrical machine can be efficiently used. The output performance of the rotating electrical machine can be improved.

Since the first inner diameter side arc magnet 821 and the second inner diameter side arc magnet 822 are arc magnets arranged so as to protrude inward in the radial direction, a q-axis magnetic path formed between the outer diameter side magnet insertion hole 410 and the first inner diameter side magnet insertion hole 421 and a q-axis magnetic path formed between the outer diameter side magnet insertion hole 410 and the second inner diameter side magnet insertion hole 422 can have a shape with a small magnetic resistance.

Further, the first inner diameter side arc magnet 821 is arranged such that the q-axis side end portion 821Q is outside a first virtual straight line VL1 passing through the arc center C10 of the outer diameter side arc magnet 810 and the left end portion 810L of the outer diameter side arc magnet 810 in the circumferential direction, and the d-axis side end portion 821D is inside the first virtual straight line VL1 in the circumferential direction. The second inner diameter side arc magnet 822 is arranged such that the q-axis side end portion 822Q is outside a second virtual straight line VL2 passing through the arc center C10 of the outer diameter side arc magnet 810 and the right end portion 810R of the outer diameter side arc magnet 810, and the d-axis side end portion 822D is inside the second virtual straight line VL2 in the circumferential direction.

As the outer diameter side arc magnet 810, the first inner diameter side arc magnet 821, and the second inner diameter side arc magnet 822, for example, an arc magnet obtained by cutting a ring magnet formed by molding using a hot working process such as hot extrusion molding in the radial direction can be used.

In the present embodiment, the thickness t10 of the outer diameter side arc magnet 810, the thickness t21 of the first inner diameter side arc magnet 821, and the thickness t22 of the second inner diameter side arc magnet 822 are the same thickness. The inner peripheral radius r10N of the inner peripheral surface 810N of the outer diameter side arc magnet 810, the inner peripheral radius r21N of the inner peripheral surface 821N of the first inner diameter side arc magnet 821 and the inner peripheral radius r22N of the inner peripheral surface 822N of the second inner diameter side arc magnet 822 have the same length. The outer peripheral radius r10F of the outer peripheral surface 810F of the outer diameter side arc magnet 810, the outer peripheral radius r21F of the outer peripheral surface 821F of the first inner diameter side arc magnet 821 and the outer peripheral radius r22F of the outer peripheral surface 822F of the second inner diameter side arc magnet 822 have the same length.

Therefore, the outer diameter side arc magnet 810, the first inner diameter side arc magnet 821, and the second inner diameter side arc magnet 822 have substantially the same shape as viewed in the axial direction. Accordingly, the same arc magnet can be used for the outer diameter side arc magnet 810, the first inner diameter side arc magnet 821, and the second inner diameter side arc magnet 822, and thus the manufacturing cost of the outer diameter side arc magnet 810, the first inner diameter side arc magnet 821, and the second inner diameter side arc magnet 822 can be reduced.

Further, in the present embodiment, each of an angle θ10 centered on the arc center C10 of the outer diameter side arc magnet 810 and formed by the left end portion 810L and the right end portion 810R of the outer diameter side arc magnet 810, a angle θ21 centered on the arc center C21 of the first inner diameter side arc magnet 821 and formed by the q-axis side end portion 821Q and the d-axis side end portion 821D, and a angle θ22 centered on the arc center C22 of the second inner diameter side arc magnet 822 and formed by the q-axis side end portion 822Q and the d-axis side end portion 822D is an angle of 360 degrees when multiplied by an integer, respectively. The formed angle θ10, the formed angle θ21 and the formed angle θ22 are, for example, 12 degrees, 15 degrees, 18 degrees, 20 degrees, 24 degrees, 30 degrees, 36 degrees, 40 degrees, 60 degrees, or the like.

Thus, the outer diameter side arc magnet 810 can be manufactured by cutting the ring magnet in the radial direction at an interval of the angle θ10 formed in the circumferential direction, the first inner diameter side arc magnet 821 can be manufactured by cutting the ring magnet in the radial direction at an angle θ21 formed in the circumferential direction, and the second inner diameter side arc magnet 822 can be manufactured by cutting the ring magnet in the radial direction at an interval of the angle θ22 formed in the circumferential direction. Therefore, since the outer diameter side arc magnet 810, the first inner diameter side arc magnet 821, and the second inner diameter side arc magnet 822 can be manufactured without generating a remainder from the ring magnet, the manufacturing cost of the outer diameter side arc magnet 810, the first inner diameter side arc magnet 821, and the second inner diameter side arc magnet 822 can be further reduced.

In the present embodiment, the formed angle θ10, the formed angle θ21 and the formed angle θ22 are substantially the same. That is, the outer diameter side arc magnet 810, the first inner diameter side arc magnet 821, and the second inner diameter side arc magnet 822 have substantially the same shape as viewed in the axial direction. Accordingly, the same arc magnet can be used for the outer diameter side arc magnet 810, the first inner diameter side arc magnet 821, and the second inner diameter side arc magnet 822, and thus the manufacturing cost of the outer diameter side arc magnet 810, the first inner diameter side arc magnet 821, and the second inner diameter side arc magnet 822 can be further reduced. In the present embodiment, the formed angle θ10, formed angle θ21 and the formed angle θ22 are all 24 degrees.

The outer diameter side magnet insertion hole 410 includes an inner peripheral wall surface 410N and an outer peripheral wall surface 410F respectively facing the inner peripheral surface 810N and the outer peripheral surface 810F of the outer diameter side arc magnet 810, a left side wall surface 410L, and a right side wall surface 410R. The first inner diameter side magnet insertion hole 421 has an inner peripheral wall surface 421N and an outer peripheral wall surface 421F facing the inner peripheral surface 821N and the outer peripheral surface 821F of the first inner diameter side arc magnet 821, respectively, a q-axis side wall surface 421Q, and a d-axis side wall surface 421D. The second inner diameter side magnet insertion hole 422 includes an inner peripheral wall surface 422N and an outer peripheral wall surface 422F facing the inner peripheral surface 822N and the outer peripheral surface 822F of the second inner diameter side arc magnet 822, respectively, a q-axis side wall surface 422Q, and a d-axis side wall surface 422D.

(Gap Portion)

The gap portion 60 is formed so as to cross the d-axis between the d-axis wall surface 421D of the first inner diameter side arc magnet 821 and the d-axis side wall surface 422D of the second inner diameter side magnet insertion hole 422 in the circumferential direction.

As a result, in the inner diameter side magnet portion 320, a gap is formed on the d-axis, and thus the d-axis inductance can be reduced. Therefore, since the difference between the d-axis inductance and the q-axis inductance can be increased, the reluctance torque can be used effectively, and the output performance of the rotating electrical machine can be improved.

(Rib)

A pair of ribs 50 are provided so as to extend in the radial direction between the pair of inner diameter side arc magnets 820 and the gap portion 60.

The pair of ribs 50 includes a first rib 51 extending radially between the d-axis side end portion 821D of the first inner diameter side arc magnet 821 and the d-axis, and a second rib 52 extending radially between the d-axis side end portion 822D of the second inner diameter side arc magnet 822 and the d-axis.

The first rib 51 is constituted by a d-axis side wall surface 421D of the first inner diameter side magnet insertion hole 421 and a left side wall surface 61 of the gap portion 60. The first rib 51 includes a radially inner side end portion 511 located radially inward and a radially outer side end portion 512 located radially outward.

The second rib 52 is constituted by the d-axis side wall surface 422D of the second inner diameter side magnet insertion hole 422 and the right side wall surface 62 of the gap portion 60. The second rib 52 includes a radially inner side end portion 521 located radially inward and a radially outer side end portion 522 located radially outward.

Therefore, the first rib 51 receives the centrifugal load by the first inner diameter side arc magnet 821, and the second rib 52 receives the centrifugal load by the second inner diameter side arc magnet 822. That is, the first rib 51 and the second rib 52 separately receive the centrifugal load by the first inner diameter side arc magnet 821 and the centrifugal load by the second inner diameter side arc magnet 822, respectively. As a result, the bending stress generated in the rotor core 20 due to the weight variation of the first inner diameter side arc magnet 821 and the second inner diameter side arc magnet 822 can be reduced.

Further, the first rib 51 and the second rib 52 are provided in a substantially V shape such that a circumferential distance L5 between the first rib 51 and the second rib 52 increases toward inner side in the radial direction. As a result, the radially inner side end portion 511 and the radially outer side end portion 512 of the first rib 51 and the radially inner side end portion 521 and the radially outer side end portion 522 of the second rib 52 can increase an angle R. The stress concentration at the radially inner side end portion 511 and the radially outer side end portion 512 of the first rib 51, and the radially inner side end portion 521 and the radially outer side end portion 522 of the second rib 52, that is, both end portions in the radial direction the first rib 51 and the second rib 52 can be reduced.

(Hole Portion)

A small-diameter first hole portion 261 is provided on the outer side in the radial direction of the first rib 51. A small-diameter second hole portion 262 is provided on the outer side in the radial direction of the second rib 52. In the present embodiment, the first hole portion 261 and the second hole portion 262 have the same diameter as viewed in the axial direction.

Therefore, in the magnetic path through which the wraparound magnetic flux in the vicinity of the d-axis side end portion 821D of the first inner diameter side arc magnet 821 passes and the magnetic path through which the wraparound magnetic flux in the vicinity of the d-axis side end portion 822D of the second inner diameter side arc magnet 822 passes, the magnetic resistance is increased by the first hole portion 261 and the second hole portion 262. Thus, the wraparound magnetic flux in the vicinity of the d-axis side end portion 821D of the first inner diameter side arc magnet 821 and the wraparound magnetic flux in the vicinity of the d-axis side end portion 822D of the second inner diameter side arc magnet 822 can be reduced.

Further, since the first hole portion 261 and the second hole portion 262 have a circular shape having the same diameter as viewed in the axial direction, the stress generated in the rotor core 20 due to the centrifugal load of the rotor 10 or the press-fitting load of the rotor shaft can be suppressed from being concentrated around the first hole portion 261 and the second hole portion 262.

(Manufacture of Arc Magnets)

Next, manufacture of the outer diameter side arc magnet 810, the first inner diameter side arc magnet 821, and the second inner diameter side arc magnet 822 will be described with reference to FIG. 3.

The outer diameter side arc magnet 810, the first inner diameter side arc magnet 821, and the second inner diameter side arc magnet 822 are manufactured by a ring magnet molding step of molding the ring magnet precursor 900 having a substantially annular shape, a heat treating step of heat treating the ring magnet precursor 900 and forming the ring magnet 910, and a cutting step of cutting the ring magnet 910 formed by the heat treating step in the radial direction.

Figure 3:
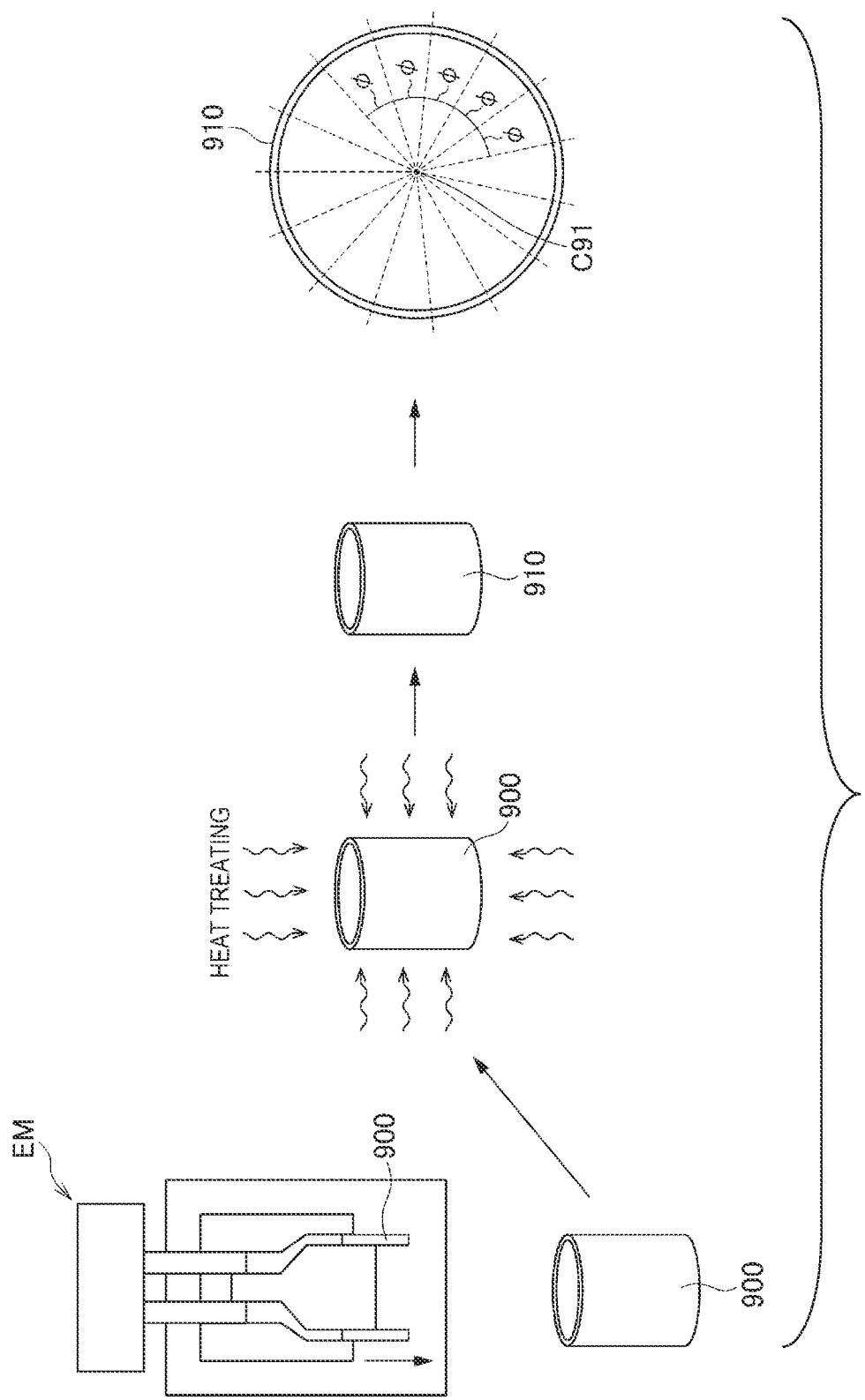
FIG. 3 is a diagram illustrating a manufacturing method of each arc magnet of the rotor of the rotating electrical machine of FIG. 1.

As shown in FIG. 3, the ring magnet precursor 900 is formed by hot working by hot extrusion molding the ring magnet material with an extrusion molding machine EM. By performing hot extrusion molding of the ring magnet material, the ring magnet material is densified, radially compressive stress acts on the crystal group of the ring magnet material that has been randomly oriented, and the crystal group of the ring magnet material is oriented in the same direction as the compressive stress direction. As a result, an anisotropic ring magnet precursor 900 oriented in the radial direction is obtained.

Here, in order to obtain the ring magnet 910 having high-performance magnetization characteristics, it is desirable that the stress acting on the crystal group of the ring magnet material is uniform across the entire area when the ring magnet precursor 900 is formed. However, if the thickness t90 of the ring magnet precursor 900 is too large with respect to the outer radius r90 of the ring magnet precursor 900, the stress acting on the crystal group of the ring magnet material becomes uneven in the hot extrusion molding, and the degree of orientation of the ring magnet 910 is lowered.

On the other hand, if the thickness t90 of the ring magnet precursor 900 is too small with respect to the outer radius r90 of the ring magnet precursor 900, the dimensional accuracy of the ring magnet precursor 900 is lowered in the hot extrusion molding, and the thickness t90 of the ring magnet precursor 900 is likely to be uneven. When the thickness t90 of the ring magnet precursor 900 is uneven, the stress acting on the crystal group of the ring magnet material becomes uneven in the hot extrusion molding, and the degree of orientation of the ring magnet 910 is lowered.

When the ring magnet material is hot-extruded and molded by the extrusion molding machine EM, an upper limit of the radially compressive stress that the extrusion molding machine EM can act on the crystal group of the ring magnet material is determined by the axial cross-sectional area of the ring magnet precursor 900. The larger the cross-sectional area of the ring magnet precursor 900 in the axial direction, the lower the upper limit of the radially compressive stress that the extrusion molding machine EM can act on the crystal group of the ring magnet material. Therefore, when the outer radius r90 of the ring magnet precursor 900 is greater than or equal to a predetermined value, the desired thickness t90 also increases, so that the axial cross-sectional area of the ring magnet precursor 900 increases, a desired compressive stress cannot be applied to the crystal group of the ring magnet material by the extrusion molding machine EM, and the performance of the magnetization characteristics of the ring magnet 910 is lowered.

Figure 4:
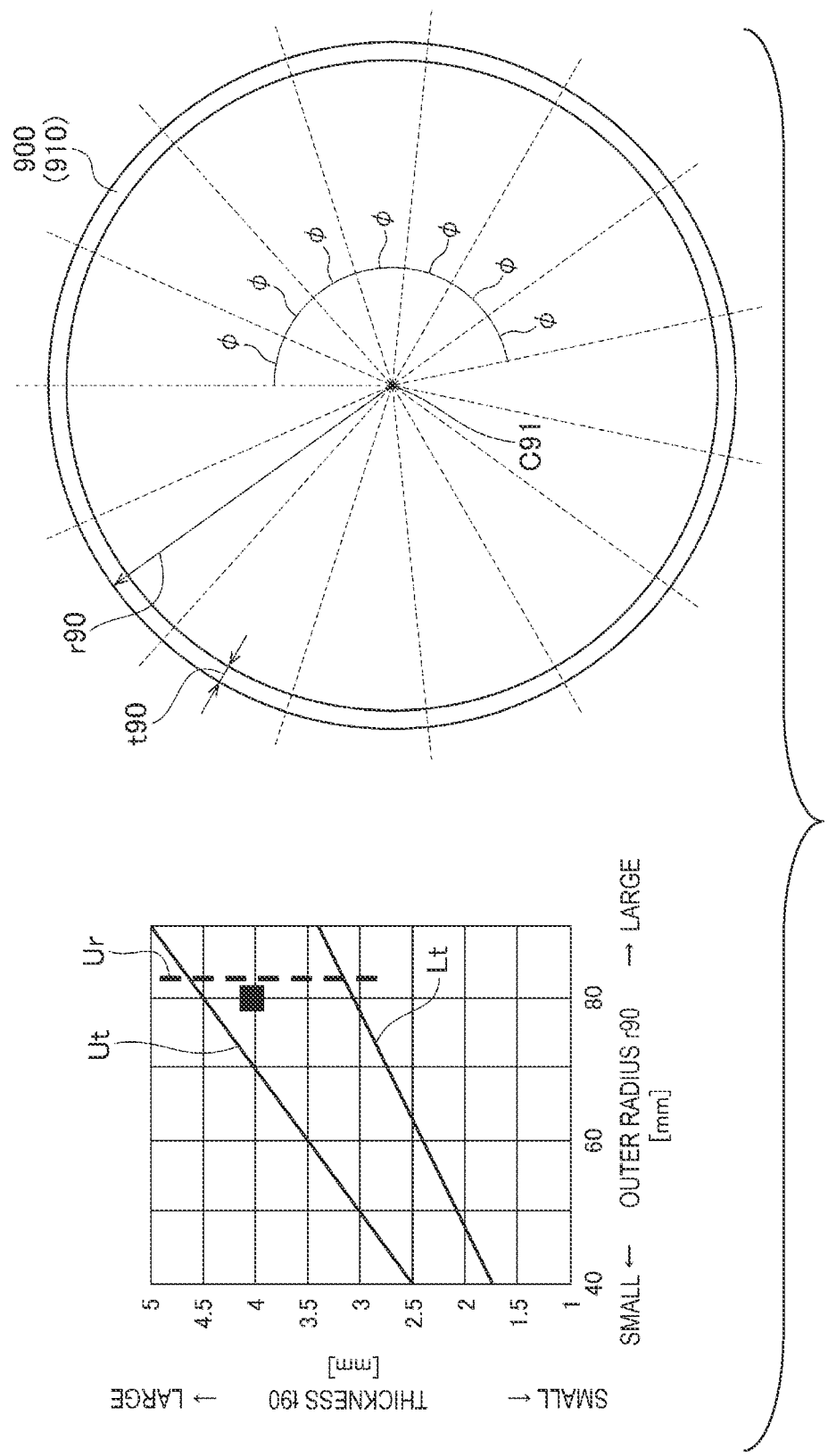
FIG. 4 is a diagram illustrating a relationship between an outer radius and a thickness at which a desired magnet performance is obtained in the outer diameter side arc magnet, the first inner diameter side arc magnet and the second inner diameter side arc magnet of the rotor of the rotating electrical machine of FIG. 1.

Therefore, as shown in FIG. 4, in the relationship between the outer radius r90 and the thickness t90 of the ring magnet precursor 900, with respect to the outer radius r90 of the ring magnet precursor 900, a high-performance magnet thickness upper limit line Ut, which is an upper limit value of the thickness 190 capable of obtaining the ring magnet 910 having high-performance magnetization characteristics, rises substantially linearly as the outer radius r90 increases. The high-performance magnet thickness upper limit line Ut is expressed by the following formula (1) in the relationship between the outer radius r90 and the thickness 190 of the ring magnet precursor 900.

$$t90 \text{ [mm]} = (1/20) \times r90 \text{ [mm]} + 0.5 \text{ [mm]} \quad (1)$$

Further, with respect to the outer radius r90 of the ring magnet precursor 900, a high-performance magnet thickness lower limit line Lt, which is the lower limit value of the thickness t90 capable of obtaining the ring magnet 910 having high-performance magnetization characteristics, rises moderately more slowly and substantially linearly than the high-performance magnet thickness upper limit line Ut as the outer radius r90 increases. The high-performance magnet thickness lower limit line Lt is expressed by the following formula (2) in the relationship between the outer radius r90 and the thickness 190 of the ring magnet precursor 900.

$$t90 \text{ [mm]} = (1/30) \times r90 \text{ [mm]} + 0.4 \text{ [mm]} \quad (2)$$

Further, the outer radius r90 of the ring magnet precursor 900 has an upper limit value at which a desired compressive stress can be applied to the crystal group of the ring magnet material by the extrusion molding machine EM, and the high-performance magnet outer radius upper limit line Ur is the upper limit value. The high-performance magnet outer radius upper limit line Ur is set regardless of the thickness 190 of the ring magnet precursor 900, and the outer radius r90 of the ring magnet precursor 900 is about 83 mm.

The ring magnet precursor 900 has an outer radius r90 of 40 mm or more and a high-performance magnet outer radius upper limit line Ur, that is, about 83 mm or less. In the relationship to the outer radius r90 of the ring magnet precursor 900, the thickness 190 is a high-performance magnet outer diameter lower limit value line Lt or more, and a high-performance magnet thickness upper limit line Ut or less, that is, in a range represented by the following formula (3).

$$(1/30) \times r90 \text{ [mm]} + 0.4 \text{ [mm]} \leq t90 \text{ [mm]} \leq (1/20) \times r90 \text{ [mm]} + 0.5 \text{ [mm]} \quad (3)$$

In the present embodiment, the ring magnet precursor 900 has an outer radius r90 of about 80 mm and a thickness t90 of about 4.2 mm.

Accordingly, when the ring magnet precursor 900 is formed, the stress acting on the crystal group of the ring magnet material can be made even over the entire area, and the ring magnet 910 having high-performance magnetization characteristics can be obtained. Therefore, the outer diameter side arc magnet 810, the first inner diameter side arc magnet 821, and the second inner diameter side arc magnet 822 having high-performance magnetization characteristics can be obtained.

Next, as shown in FIG. 3, the ring magnet precursor 900 is heat-treated in the heat treating step to form a ring magnet 910 having an outer radius r90 and a thickness t90. The residual magnetic flux density and the intrinsic coercive force of the ring magnet 910 change depending on the temperature and time of the heat treating.

Next, as shown in FIG. 3, the ring magnet 910 is cut in the radial direction by the cutting step, and the outer diameter side arc magnet 810, the first inner diameter side arc magnet 821, and the second inner diameter side arc magnet 822 are manufactured.

The ring magnet 910 is cut in the radial direction at an interval of a predetermined angle φ in the circumferential direction with the ring center C91 of the ring magnet 910 as the center.

Accordingly, the outer peripheral radius r10F is the outer radius r90 of the ring magnet precursor 900, the thickness t10 is the thickness t90 of the ring magnet precursor 900, and the outer diameter side arc magnet 810 in which the angle formed by the left side end portion 810L and the right side end portion 810R with the arc center C10 as the center is a predetermined angle 9 is manufactured.

Similarly, the outer peripheral radius r2F, r22F is the outer radius r90 of the ring magnet precursor 900, the thickness t21, t22 is the thickness t90 of the ring magnet precursor 900, and the first inner diameter side arc magnet 821 and the second inner diameter side arc magnet 822 having the angle formed by the d-axis side end portions 821D, 822D and the q-axis side end portions 821Q, 822Q is a predetermined angle 9 centered on the arc centers C21, C22 are manufactured.

At this time, the predetermined angle q is an angle of 360 degrees when multiplied by an integer. For example, the predetermined angle φ is 12 degrees, 15 degrees, 18 degrees, 20 degrees, 24 degrees, 30 degrees, 36 degrees, 40 degrees, 60 degrees, or the like.

Thus, since the outer diameter side arc magnet 810, the first inner diameter side arc magnet 821, and the second inner diameter side arc magnet 822 can be manufactured without generating a remainder from the ring magnet 910, the manufacturing cost of the outer diameter side arc magnet 810, the first inner diameter side arc magnet 821, and the second inner diameter side arc magnet 822 can be reduced.

In the present embodiment, the predetermined angle φ is 24 degrees. Accordingly, fifteen outer diameter side arc magnets 810, first inner diameter side arc magnets 821, or second inner diameter side arc magnets 822 are manufactured without generating a remainder from one ring magnet 910.

In this way, the outer diameter side arc magnet 810, the first inner diameter side arc magnet 821, and the second inner diameter side arc magnet 822 can be manufactured from the same ring magnet precursor 900 formed in a substantially annular shape by the same extrusion molding machine EM. Thus, the manufacturing cost of the outer diameter side arc magnet 810, the first inner diameter side arc magnet 821, and the second inner diameter side arc magnet 822 can be reduced.

Although the embodiment of the present disclosure has been described above, the present disclosure is not limited thereto and modifications, improvements, or the like can be made as appropriate.

For example, in the present embodiment, the ring magnet 910 is manufactured by heat-treating the ring magnet precursor 900 formed by hot working, but the ring magnet 910 may be a sintered magnet whose degree of orientation is appropriately adjusted.

At least the following matters are described in the present specification. Although corresponding constituent elements or the like in the above embodiment are illustrated in parentheses, the present invention is not limited thereto.

(1) A rotor (rotor 10) of a rotating electrical machine, including:

a substantially annular rotor core (rotor core 20); and a plurality of magnetic pole portions (magnetic pole portions 30) formed at predetermined intervals in a circumferential direction of the rotor core, in which each magnetic pole portion including:

an outer diameter side magnet portion (outer diameter side magnet portion 310) configured by an outer diameter side circular arc magnet (outer diameter side arc magnet 810) arranged so as to protrude radially inward, and an inner diameter side magnet portion (inner diameter side magnet portion 320) located radially inward of the outer diameter side magnet portion and configured by a pair of inner diameter side arc magnets (inner diameter side arc magnets 820) arranged so as to radially inward of the radially outer magnet portion, each arc magnet is an arc magnet in which an inner peripheral surface and an outer peripheral surface have the same arc center, in a case where a center axis of each magnetic pole portion is set as a d-axis, and an axis separated from the d-axis by 90 electrical degrees is set as a q-axis, the outer diameter side magnet portion and the inner diameter side magnet portion are formed symmetrically with respect to the d-axis, the outer diameter side arc magnet is disposed so as to be symmetrical with respect to the d-axis in the circumferential direction, the pair of inner diameter side arc magnets including:

a first inner diameter side arc magnet (first inner diameter arc magnet 821) located on one side (left side) with respect to the d-axis in the circumferential direction, and a second inner diameter side arc magnet (second inner diameter arc magnet 822) located on the other side (right side) with respect to the d-axis in the circumferential direction, the first inner diameter side arc magnet and the second inner diameter side arc magnet are arranged so as to be symmetrical with respect to the d-axis, the outer diameter side arc magnet, the first inner diameter side arc magnet, and the second inner diameter side arc magnet have substantially the same shape as viewed in the axial direction, an arc center (arc center C10) of the outer diameter side arc magnet is located on the d-axis, an arc center (arc center C21) of the first inner diameter side arc magnet is located on the other side with respect to the d-axis in the circumferential direction, and an arc center (arc center C22) of the second inner diameter side arc magnet is located on the one side with respect to the d-axis in the circumferential direction.

According to (1), since the outer diameter side arc magnet, the first inner diameter side arc magnet, and the second inner diameter side arc magnet have substantially the same shape, the same arc magnet can be used for the outer diameter side arc magnet, the first inner diameter side arc magnet, and the second inner diameter side arc magnet, and the manufacturing cost of the outer diameter side arc magnet, the first inner diameter side arc magnet, and the second inner diameter side arc magnet can be reduced.

Further, since the arc center of the outer diameter side arc magnet is located on the d-axis, the arc center of the first inner diameter side arc magnet is located on the other side with respect to the d-axis in the circumferential direction, and the arc center of the second inner diameter side arc magnet is located on one side with respect to the d-axis in the circumferential direction, the increase in the circumferential length of the magnetic pole portion can be suppressed, and the increase in the size of the rotor can be suppressed. In addition, a q-axis magnetic path in the rotor can be widened, and the reluctance torque of the rotating electrical machine can be increased, the output performance of the rotating electrical machine can be improved. Further, the magnetic flux due to the first inner diameter side arc magnet and the second inner diameter side arc magnet and the outer diameter side arc magnet is easily concentrated on the d-axis, and the magnet torque of the rotating electrical machine can be efficiently used. The output performance of the rotating electrical machine can be improved.

(2) The rotor of a rotating electrical machine according to (1), in which the outer diameter side arc magnet includes a first end portion (left end portion 810L) located on the one side with respect to the d-axis and a second end portion (right end portion 810R) located on the other side with respect to the d-axis in the circumferential direction, the first inner diameter side arc magnet includes a d-axis side end portion (d-axis side end portion 821D) on the d-axis side and a q-axis side end portion (q-axis side end portion 821Q) on the q-axis side in the circumferential direction, the second inner diameter side arc magnet includes a d-axis side end portion (d-axis side end portion 822D) on the d-axis side and a q-axis side end portion (q-axis side end portion 822Q) on the q-axis side in the circumferential direction, the angle (formed angle θ10) centered on the arc center of the outer diameter side arc magnet and formed by the first end portion and the second end portion of the outer diameter side arc magnet when viewed from the axial direction is an angle of 360 degrees when multiplied by an integer, and an angle (formed angle θ21) centered on the arc center of the first inner diameter side arc magnet and formed by the q-axis side end portion and the d-axis side end portion and an angle (formed angle θ22) centered on the arc center of the second inner diameter side arc magnet and formed by the q-axis side end portion and the d-axis side end portion are an angle of 360 degrees when multiplied by an integer.

According to (2), since the angle centered on the arc center of the outer diameter side arc magnet and formed by the first end portion and the second end portion of the outer diameter side arc magnet is an angle of 360 degrees when multiplied by an integer, the angle centered on the arc center of the first inner diameter side arc magnet and formed by the q-axis side end portion and the d-axis side end portion, and the angle centered on the arc center of the second inner diameter side arc magnet and formed by the q-axis side end portion and the d-axis side end portion are angles of 360 degrees when multiplied by an integer, an outer diameter side arc magnet, a first inner diameter side arc magnet, and a second inner diameter side arc magnet can be manufactured by cutting the ring magnet in the radial direction at intervals of a predetermined angle in the circumferential direction. Thus, since the outer diameter side arc magnet, the first inner diameter side arc magnet, and the second inner diameter side arc magnet can be manufactured without generating a remainder from the ring magnet, the manufacturing cost of the outer diameter side arc magnet, the first inner diameter side arc magnet, and the second inner diameter side arc magnet can be further reduced.

(3) The rotor of a rotating electrical machine according to (1) or (2), in which when the outer peripheral radii (outer peripheral radii r10F, r21F, r22F) of the outer diameter side arc magnet, the first inner diameter side arc magnet, and the second inner diameter side arc magnet are set to r [mm], and the thicknesses (thickness t10, t21, t22) of the outer diameter side arc magnet, the first inner diameter side arc magnet, and the second inner diameter side arc magnet are set to t [mm], $$40 \, [\text{mm}] \leq r \leq 83 \, [\text{mm}], \text{ and,}$$

$$(\tfrac{1}{30}) \times r + 0.4 \, [\text{mm}] \leq t \leq (\tfrac{1}{20}) \times r + 0.5 \, [\text{mm}].$$

According to (3), an outer diameter side arc magnet, a first inner diameter side arc magnet and a second inner diameter side arc magnet having high-performance magnetization characteristics can be obtained.

(4) An arc magnet manufacturing method for manufacturing each arc magnet of the rotor of the rotating electrical machine according to any one of (1) to (3), including:

a ring magnet molding step of molding a ring magnet (ring magnet 910) having a substantially annular shape; and a cutting step of cutting the ring magnet formed by the ring magnet molding step in a radial direction, in which in the ring magnet molding step, the ring magnet is formed by hot working, and in the cutting step, the outer diameter side arc magnet, the first inner diameter side arc magnet and the second inner diameter side arc magnet can be manufactured by cutting the ring magnet in the radial direction at an interval of a predetermined angle (predetermined angle φ centered on the ring center (ring center C91) of the ring magnet.

According to (4), since the outer diameter side arc magnet, the first inner diameter side arc magnet and the second inner diameter side arc magnet can be manufactured from the same ring magnet formed in a substantially annular shape by the same molding machine, the manufacturing cost of the outer diameter side arc magnet, the first inner diameter side arc magnet and the second inner diameter side arc magnet can be reduced.

(5) The arc magnet manufacturing method according to (4), in which the predetermined angle is an angle of 360 degrees when multiplied by an integer.

According to (5), since the predetermined angle is an angle of 360 degrees when multiplied by an integer, the outer diameter side arc magnet, the first inner diameter side arc magnet and the second inner diameter side arc magnet can be manufactured without generating a remainder from the ring magnet, and the manufacturing cost of the outer diameter side arc magnet, the first inner diameter side arc magnet and the second inner diameter side arc magnet can be further reduced.

(6) The arc magnet manufacturing method according to (4) or (5), when the outer radius (outer radius r90) of the ring magnet is set to r [mm], and the thickness (thickness t90) is set to t [mm], 40 [mm]≤r≤83 [mm], and, (1/30)×r+0.4 [mm]≤t≤(1/20)×r+0.5 [mm].

According to (6), a ring magnet having high-performance magnetization characteristics can be obtained, and therefore, the outer diameter side arc magnet, the first inner diameter side arc magnet and the second inner diameter side arc magnet having high-performance magnetization characteristics can be obtained.

What is claimed is:

1. A rotor of a rotating electrical machine, comprising:
a substantially annular rotor core; and
a plurality of magnetic pole portions formed at predetermined intervals in a circumferential direction of the rotor core,
wherein each magnetic pole portion including:
an outer diameter side magnet portion configured by an outer diameter side circular arc magnet arranged so as to protrude radially inward; and
an inner diameter side magnet portion located radially inward of the outer diameter side magnet portion and configured by a pair of inner diameter side arc magnets arranged so as to be radially inward of the outer diameter side magnet portion,
each arc magnet is an arc magnet in which an inner peripheral surface and an outer peripheral surface have the same arc center,
in a case where a center axis of each magnetic pole portion is set as a d-axis, and an axis separated from the d-axis by 90 electrical degrees is set as a q-axis,
the outer diameter side magnet portion and the inner diameter side magnet portion are formed symmetrically with respect to the d-axis,
the outer diameter side arc magnet is disposed so as to be symmetrical with respect to the d-axis in the circumferential direction,
the pair of inner diameter side arc magnets including:
a first inner diameter side arc magnet located on one side with respect to the d-axis in the circumferential direction; and
a second inner diameter side arc magnet located on the other side with respect to the d-axis in the circumferential direction,
the first inner diameter side arc magnet and the second inner diameter side arc magnet are arranged so as to be symmetrical with respect to the d-axis,
the outer diameter side arc magnet, the first inner diameter side arc magnet, and the second inner diameter side arc magnet have substantially the same shape as viewed in the axial direction,
an arc center of the outer diameter side arc magnet is located on the d-axis,
an arc center of the first inner diameter side arc magnet is located on the other side with respect to the d-axis in the circumferential direction, and
an arc center of the second inner diameter side arc magnet is located on the one side with respect to the d-axis in the circumferential direction.

2. The rotor of a rotating electrical machine according to claim 1, wherein
the outer diameter side arc magnet includes a first end portion located on the one side with respect to the d-axis and a second end portion located on the other side with respect to the d-axis in the circumferential direction,
the first inner diameter side arc magnet includes a d-axis side end portion on the d-axis side and a q-axis side end portion on the q-axis side in the circumferential direction,
the second inner diameter side arc magnet includes a d-axis side end portion on the d-axis side and a q-axis side end portion on the q-axis side in the circumferential direction,
the angle centered on the arc center of the outer diameter side arc magnet and formed by the first end portion and the second end portion of the outer diameter side arc magnet when viewed from the axial direction is an angle of 360 degrees when multiplied by an integer, and
an angle centered on the arc center of the first inner diameter side arc magnet and formed by the q-axis side end portion and the d-axis side end portion and an angle centered on the arc center of the second inner diameter side arc magnet and formed by the q-axis side end portion and the d-axis side end portion are an angle of 360 degrees when multiplied by an integer.

3. The rotor of a rotating electrical machine according to claim 1, wherein
when the outer peripheral radii of the outer diameter side arc magnet, the first inner diameter side arc magnet, and the second inner diameter side arc magnet are set to r[mm], and the thicknesses of the outer diameter side arc magnet, the first inner diameter side arc magnet, and the second inner diameter side arc magnet are set to t[mm], 40 [mm]≤r≤83 [mm], and, (1/30)×r+0.4 [mm]≤t≤(1/20)×r+0.5 [mm].

4. An arc magnet manufacturing method for manufacturing each arc magnet of the rotor of the rotating electrical machine according to claim 1, including:
a ring magnet molding step of molding a ring magnet having a substantially annular shape; and
a cutting step of cutting the ring magnet formed by the ring magnet molding step in a radial direction, in which
in the ring magnet molding step, the ring magnet is formed by hot working, and in the cutting step, the outer diameter side arc magnet, the first inner diameter side arc magnet and the second inner diameter side arc magnet can be manufactured by cutting the ring magnet in the radial direction at an interval of a predetermined angle centered on the ring center of the ring magnet.

5. The arc magnet manufacturing method according to claim 4, wherein
the predetermined angle is an angle of 360 degrees when multiplied by an integer.

6. The arc magnet manufacturing method according to claim 4,
when the outer radius of the ring magnet is set to r[mm], and the thickness is set to t[mm], 40 [mm]$\leq r \leq$83 [mm], and, $(1/30) \times r + 0.4$ [mm]$\leq t \leq (1/20) \times r + 0.5$ [mm].

\* \* \* \* \*